United States Patent [19]
Yamamoto et al.

[11] Patent Number: 5,930,542
[45] Date of Patent: Jul. 27, 1999

[54] READING OPERATION CONTROL DEVICE

[75] Inventors: Yasuhiro Yamamoto; Koichi Sato, both of Tokyo, Japan

[73] Assignee: Asahi Kogaku Kogyo Kabushiki Kaisha, Tokyo, Japan

[21] Appl. No.: 08/751,158

[22] Filed: Nov. 15, 1996

[30] Foreign Application Priority Data

Nov. 27, 1995 [JP] Japan .................................... 7-331053

[51] Int. Cl.$^6$ .................................................. G03B 19/00
[52] U.S. Cl. ........................... 396/429; 348/233; 358/906
[58] Field of Search ..................... 348/231, 233; 396/30, 429, 430; 358/906, 909.1; 386/107, 117, 118

[56] References Cited

U.S. PATENT DOCUMENTS

| | | |
|---|---|---|
| 4,841,322 | 6/1989 | Kawasaki et al. . |
| 4,945,376 | 7/1990 | Kawasaki et al. . |
| 5,027,216 | 6/1991 | Takanashi et al. ................. 358/213.11 |
| 5,093,731 | 3/1992 | Watanabe et al. ....................... 358/335 |
| 5,159,458 | 10/1992 | Murata et al. ............................ 358/229 |
| 5,315,410 | 5/1994 | Takanshi et al. . |
| 5,408,341 | 4/1995 | Takanashi et al. . |
| 5,416,560 | 5/1995 | Taka ........................................ 354/471 |
| 5,424,156 | 6/1995 | Aoki et al. . |
| 5,516,607 | 5/1996 | Iijima et al. ............................... 430/20 |

FOREIGN PATENT DOCUMENTS

| | | |
|---|---|---|
| 0327236 | 8/1989 | European Pat. Off. . |
| 0622954 | 2/1994 | European Pat. Off. . |
| 2-29081 | 1/1990 | Japan . |
| 3-15087 | 1/1991 | Japan . |
| 3278342 | 12/1991 | Japan . |
| 5-2280 | 1/1993 | Japan . |
| 5-24706 | 4/1993 | Japan . |
| 5150251 | 6/1993 | Japan . |
| 5165005 | 6/1993 | Japan . |
| 6130347 | 5/1994 | Japan . |
| 6313894 | 11/1994 | Japan . |
| 7-13132 | 1/1995 | Japan . |
| 7113132 | 1/1995 | Japan . |

*Primary Examiner*—Safet Metjahic
*Assistant Examiner*—John Chizmar
*Attorney, Agent, or Firm*—Greenblum & Bernstein, P.L.C.

[57] ABSTRACT

A reading operation control device provided in an electro-developing type camera using a recording medium which electronically develops an image formed by a photographing optical system. When an electro-developing recording medium is mounted, it is determined whether or not the electro-developing recording medium has been recorded. If the electro-developing recording medium has not been recorded, and when a record mode is set and a release switch is turned ON, a recording operation is performed, and thus an image is recorded in the electro-developing recording medium. If the electro-developing recording medium has been recorded, and then a reading mode is set and a scanning switch is turned ON, a reading operation is performed, and thus the image recorded in the electro-developing recording medium is read.

12 Claims, 7 Drawing Sheets

READING OPERATION CONTROL DEVICE

BACKGROUND OF THE INVENTION

1. Field of the Invention

The present invention relates to a camera using a recording medium in which an object image obtained through a photographing optical system is electronically developed, and more particularly, to a device controlling a reading operation in which the image recorded in the recording medium is read.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. In this specification, such a recording medium is referred to as an electro-developing recording material, and an electronic still camera using the electro-developing recording material is referred to as an electro-developing type camera.

An optical sensor, such as a line sensor, can be provided in the electro-developing type camera so that an image recorded in the electro-developing recording medium is read therefrom and image data corresponding to the image is recorded on an IC card. However, if a reading operation is performed again after the image is read from the electro-developing recording medium, the identical data from the two images is recorded in two recording areas of the IC card, or a storing operation in which image data is stored in only one recording area but is performed twice, and thus one of the two reading operations is useless.

SUMMARY OF THE INVENTION

Therefore, an object of the present invention is to provide a reading operation control device by which a useless reading operation for an image recorded in an electro-developing recording medium is abolished.

According to the present invention, there is provided a device for controlling a reading operation of an image reading device, in which an image recorded in a recording medium is read therefrom, the reading operation control device comprising: a first determining processor; an image reading processor and an reading operation prohibiting processor.

The first determining processor determines whether or not a recording medium has been mounted in the image reading device. The image reading processor reads an image recorded in the recording medium. The reading operation prohibiting processor prohibits a reading operation by the image reading processor, until the first determining processor concludes that a recorded recording medium is mounted in the image reading device. The reading operation prohibiting processor is actuated when the reading operation of the image reading processor has been completed.

Further, according to the present invention, there is provided a device for controlling an operation of an electro-developing type camera, in which an image obtained by an optical photographing system is formed on an electro-developing recording medium, by which the image is electronically developed and held therein, the control device comprising: a determining processor; an image reading processor and a reading operation prohibiting processor.

The determining processor determines whether the electro-developing recording medium has been mounted in the electro-developing type camera. The image reading processor reads the image held in the electro-developing recording medium. The reading operation prohibiting processor prohibits a reading operation of the image reading processor until another electrodeveloping recording medium, which has been recorded, is mounted in the electro-developing type camera when the reading operation has been completed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
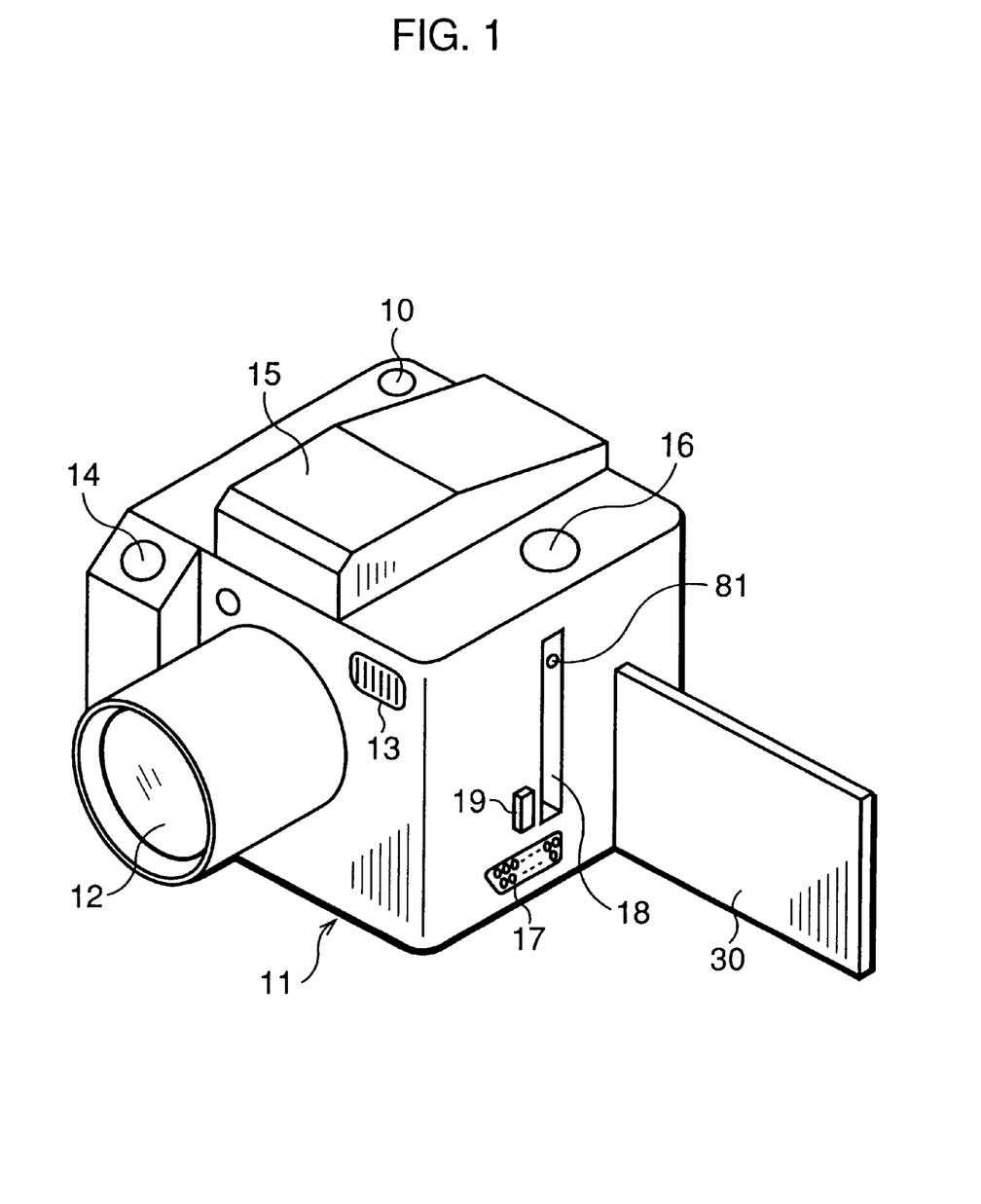
FIG. 1 is an external view showing an electro-developing type camera to which an embodiment according to the present invention is applied.

FIG. 1 is an external view of an electro-developing type camera to which an embodiment according to the present invention is applied.

When viewing a camera body 11 from the front side, a photographing optical system 12 including a photographing lens system and so on is provided approximately at a center portion of the front surface of the camera body 11, and an electronic flash 13 is disposed thereon to the right of and above the photographing optical system 12. A release button 14 is provided on the side opposite to the electronic flash 13.

On the upper surface of the camera body 11, a view finder 15 is provided at a center portion thereof and is extended from the front end to the rear end of the camera body 11. A main switch 10, by which the electric power can be turned ON and an operation mode of the camera can be set, is provided on the upper surface to the right of the view finder 15. A scanning switch 16 is provided on the side opposite to the main switch 10.

An output terminal 17 is formed on a lower portion of a side surface of the camera body 11, so that an image signal obtained by this camera can be outputted to an external recording device. Furthermore, a slot 18, into which the electro-developing recording medium 30 is mounted in the camera body 11, is formed on the side surface of the camera body 11, and an eject switch 19, which is pressed to remove the electro-developing recording medium 30 from the camera body 11, is provided close to the slot 18. A recording medium sensing switch 81 is provided close to the inlet of the slot 18 to sense whether the electro-developing recording medium 30 is mounted inside or removed from the camera body 11.

Figure 2:
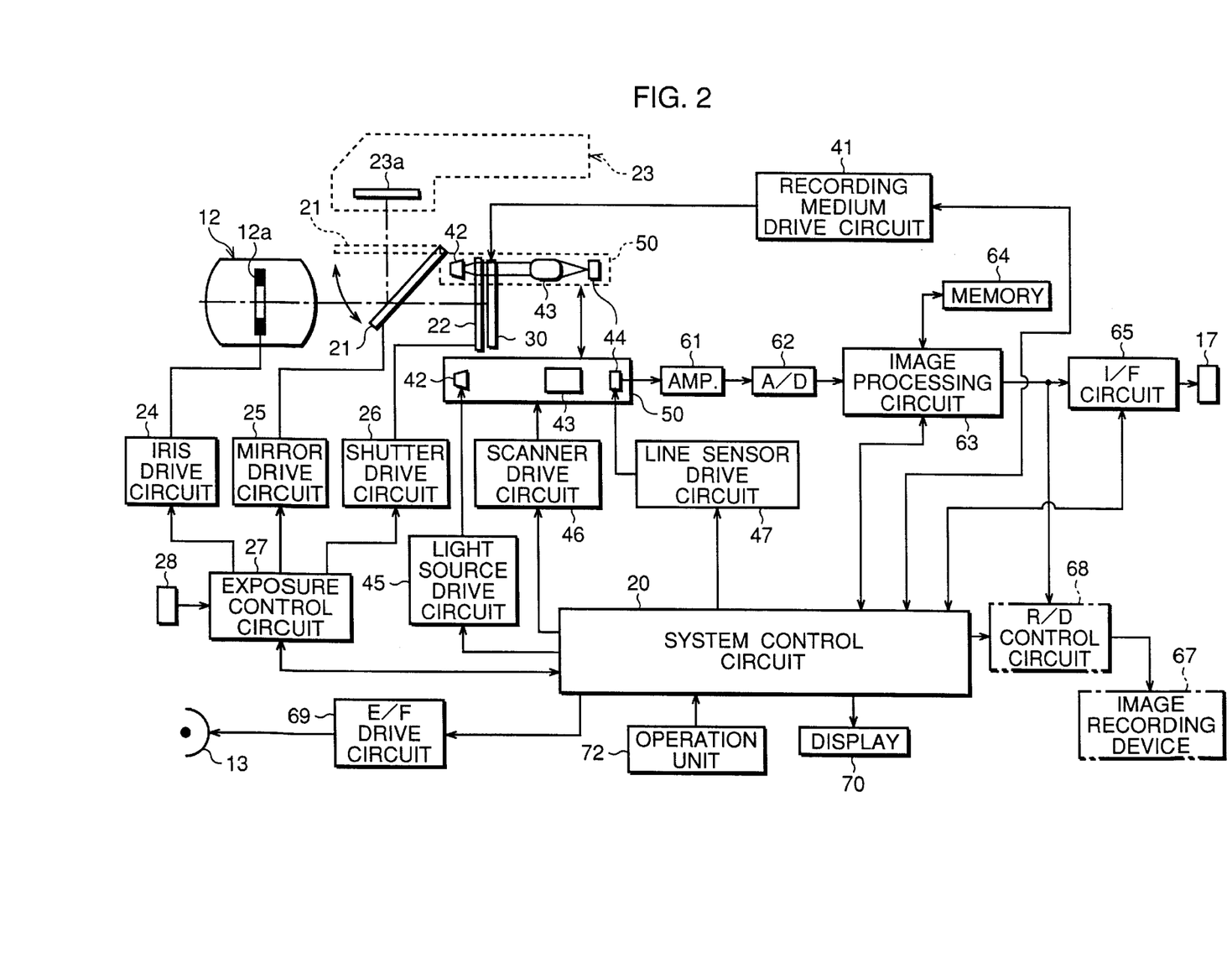
FIG. 2 is a block diagram of the electro-developing type camera.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively. All of which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under the control of the exposure control circuit 27 based on a signal outputted by a photometry sensor 28.

The quick return mirror 21 is usually set to a down position (an inclining position shown by the solid line in the drawing), so that a light beam passing through the photographing optical system 12 is led to the view-finder optical system 23, and thus an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, but during a photographing operation, the shutter 22 is opened for a predetermined period by the shutter drive circuit 26 under the control of the exposure control circuit 27. Thus, the light beam passing through the photographing optical system 12 enters a light receiving surface of the electro-developing recording medium 30, to thereby form a two-dimensional image thereon. Note that the shutter 22 is also opened when a scanning operation of the scanning mechanism 50 is performed.

An electric voltage (recording medium activating signal) is applied to the electro-developing recording medium 30 under the control of a recording medium drive circuit 41. By exposing the electro-developing recording medium 30 while applying this voltage, an image formed by the photographing optical system 12 is electronically developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42 includes an LED (light emitting diode) and a collimating lens, and emits a parallel light beam. The light source 42, a scanner optical system 43 and a line sensor 44 are supported by the scanning mechanism 50, and are moved along the electro-developing recording material 30 by a scanning operation of the scanning mechanism 50.

The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image into an electrical signal. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. When a scan is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44, through an operation of the scanner optical system 43. Namely, the scanner optical system 43 is disposed on the optical path of the light beam which passes through the electro-developing recording medium 30, and the line sensor 44 is moved on an imaging plane, on which an image is formed by the scanner optical system 43.

ON and OFF control of the light source 42 is performed by a light source drive circuit 45, and the control of the reading operation of pixel signals generated in the line sensor 44 is carried out by a line sensor drive circuit 47. The control of the movement of the scanning mechanism 50 is performed by a scanner drive circuit 46. The circuits 45, 46 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction and so on by an image processing circuit 63 under the control of the system control circuit 20, and then temporarily stored in a memory 64. The memory 64 includes an EEPROM in which correction data for the shading correction is stored. Note that the memory 64 may have a storage capacity equal to one horizontal scanning line outputted from the line sensor 44, or may have a storage capacity of pixel signals of one frame.

The pixel signals read from the memory 64 are inputted to an interface circuit 65 through the image processing circuit 63, so that the pixel signals are subjected to a predetermined process such as a format conversion, and can be outputted to an external computer (not shown) through the output terminal 17. The pixel signals outputted from the image process circuit 63 are subjected to a predetermined process such as an image compression and a format conversion in a recording device control circuit 68, so that the pixel signals can be recorded on a recording medium, such as an IC memory card, for example, in an image recording device 67. The interface circuit 65 and the recording device control circuit 68 are operated in accordance with a command signal outputted from the system control circuit 20.

An operation unit 72 having the main switch 10, the release button 14, and the scanning switch 16 is connected to the system control circuit 20. The main switch 10 is also used as a mode switch for setting each of the operation modes of the electro-developing type camera. A photographing operation (i.e., a recording operation) is carried out by fully depressing the release switch 14, so that an object image is recorded in the electro-developing recording medium 30. When the scanning switch 16 is depressed, the scanning mechanism 50 is actuated, and thus, an image recorded in the electro-developing recording medium 30 is read through the line sensor 44. A display device 70, for indicating various setting conditions of the electro-developing type camera, and an electronic flash drive circuit 69, for performing a flash control of the electronic flash 13 are also connected to the system control circuit 20.

Figure 3:
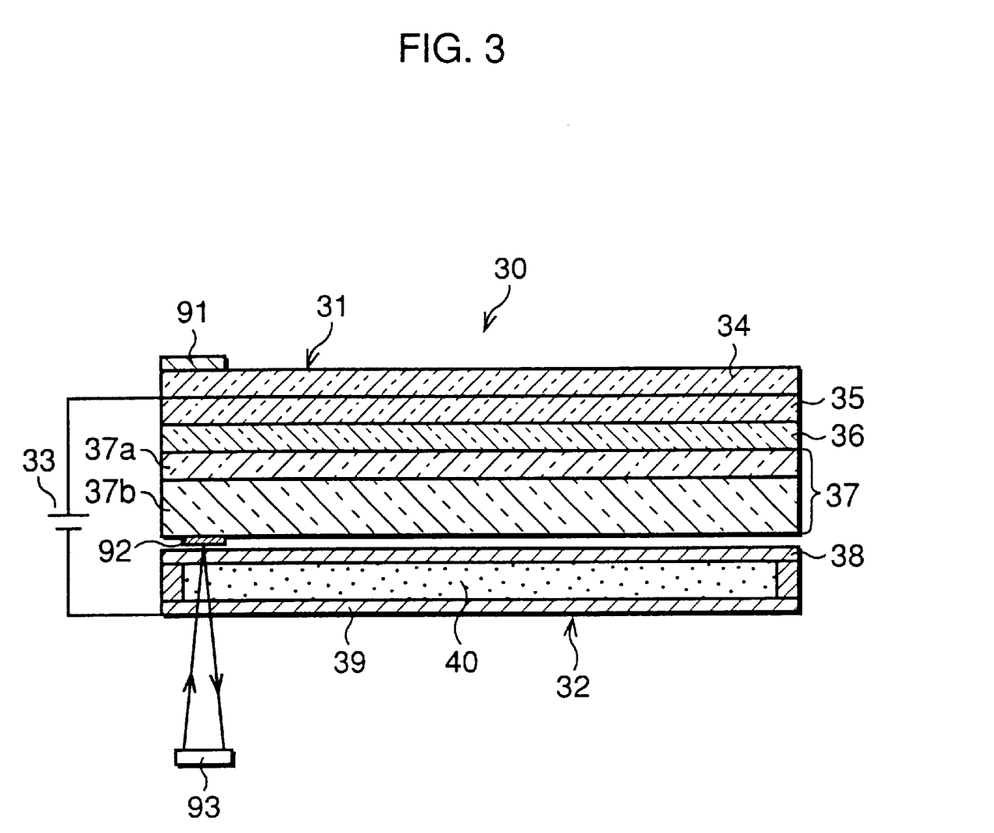
FIG. 3 is a sectional view showing a structure of an electro-developing recording medium.

FIG. 3 shows a structure of the electro-developing recording medium 30, which is obtained by modifying an electro-developing recording medium shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining a liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap between them.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an object image is developed. Namely, the visible image is generated in accordance with the electric charge.

The electric charge storage medium 32 is a liquid crystal display having a memory-type liquid crystal, and thus, the developed visible image is held therein even if the electric field is removed. The developed visible image of the LCD can be erased by heating it, using a heating device (not shown) to a predetermined temperature. As a result, the same electric charge storage medium 32 can be used repeatedly.

The electro-developing recording medium 30 is constructed so as to be able to determine whether a recording has been made upon it. While an electric voltage is being applied to the electro-developing recording medium 30, the transparency thereof is changed even in a portion which is shielded from light and is not exposed. Furthermore, this transparency remains even after the electric voltage is removed. Therefore, by taking advantage of the characteristics in which the transparency is changed in accordance with the application of the electric voltage, it can be determined whether the electro-developing recording medium 30 has been recorded or not.

In more detail, a part of the light receiving surface of the electrostatic information recording medium 31, or a part of the surface of the base plate 34, is covered with a metal foil fragment such as an aluminum foil fragment 91, so that a light shield portion is formed. The light shield portion is positioned outside of the image area of the liquid crystal display 40, where an image is formed. Additionally, a reflecting element 92 is provided on a part of a surface opposite to the electrostatic information recording medium 31 of the electro-developing recording medium 30, or a part of the surface of the photoconducting layer 37, and is aligned with the light shield portion. The reflecting element 92 may be a metal foil fragment such as an aluminum foil fragment, or may be obtained by applying a paint having a reflectivity to the photoconducting layer 37.

A transparency sensor 93 is disposed at a position corresponding to the reflecting element 92, and under the electric charge storage medium 32. The transparency sensor 93 has a light emitting diode and a light receiving diode. Light emitted by the light emitting diode of the transparency sensor 93 enters the reflecting element 92 through the liquid crystal display 40, and is reflected back by the reflecting element 92. The reflected light passes once again, through the liquid crystal display 40, and is received by the light receiving diode of the transparency sensor 93. The light receiving diode then outputs a signal corresponding to and in proportion with the intensity of the reflected light.

Figure 4:
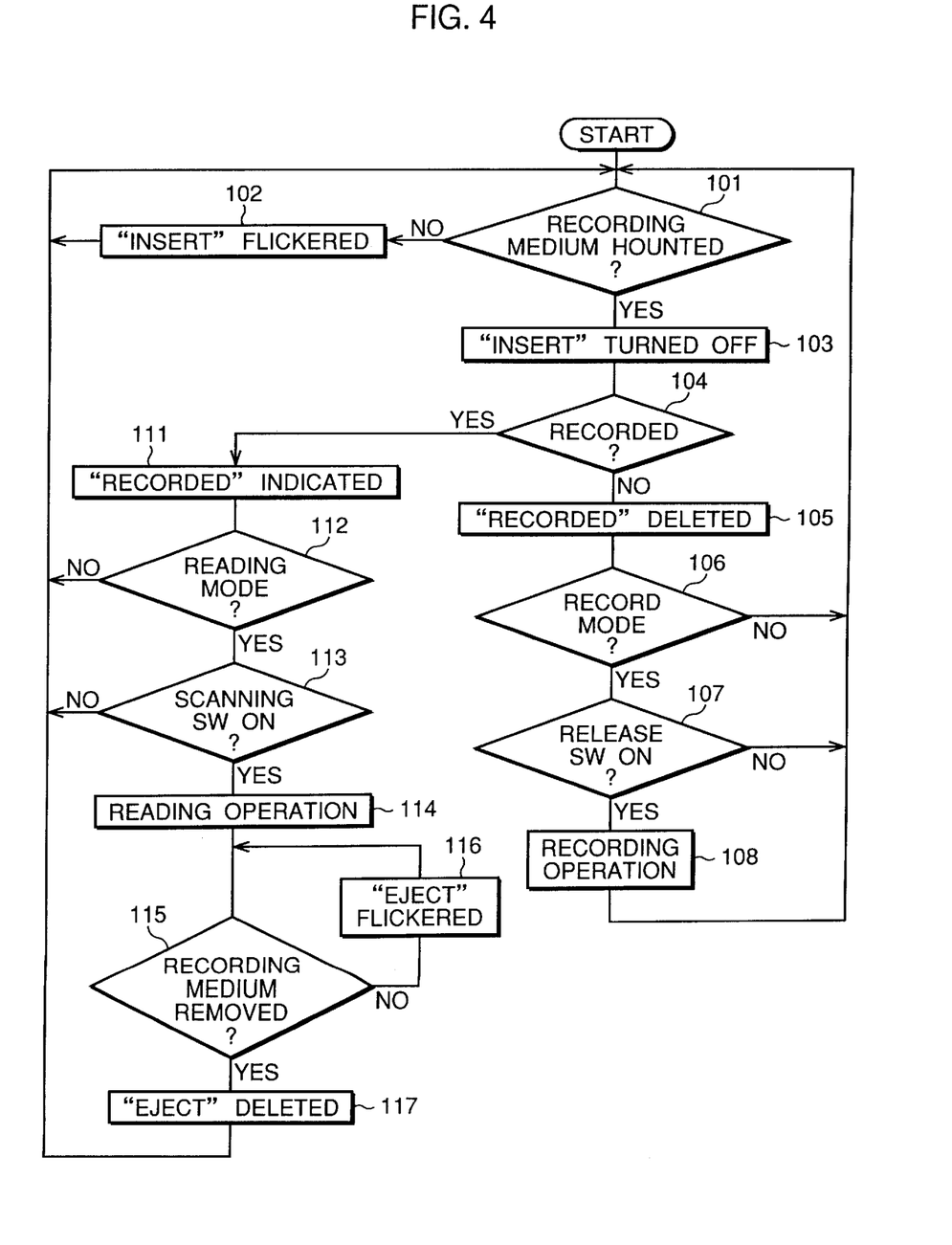
FIG. 4 is a flow chart of a program by which an image is recorded in the electro-developing recording medium and the image is read therefrom, in a first embodiment.
Figure 5:
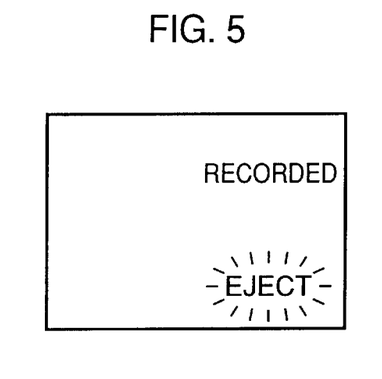
FIG. 5 is a view showing an indication of a display device when the electro-developing recording medium should be removed.
Figure 6:
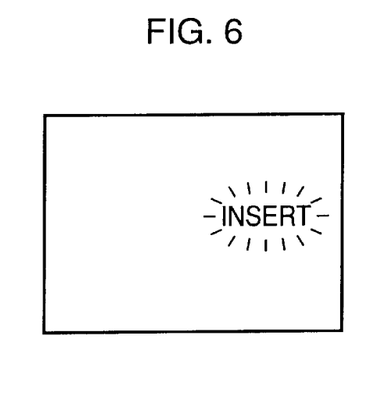
FIG. 6 is a view showing an indication of the display device when the electro-developing recording medium should be mounted.
Figure 7:
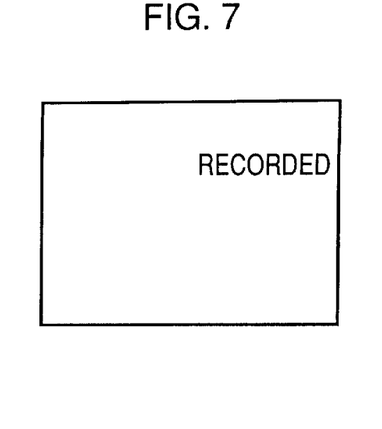
FIG. 7 is a view showing an indication of the display device when the electro-developing recording medium mounted in the camera body has been recorded.

FIG. 4 is a flow chart of a program for recording an image in the electro-developing recording medium 30, and reading the recorded image therefrom. FIGS. 5, 6, and 7 show indications shown by the display device 70. Note that, in this embodiment, only one object image can be recorded in the one electro-developing recording medium 30, however in the case of a color image, three primary color images including a red image, a green image, and a blue image, which correspond to an identical object image, are recorded in the electro-developing recording medium 30. The three primary color images forms one color object image.

In Step 101, it is determined whether an electro-developing recording medium 30 has been mounted in the camera body 11 based on an output signal of the recording medium sensing switch 81. When the electro-developing recording medium 30 has not been mounted, Step 102 is executed. In Step 102, a message "INSERT" is flickered by the display device 70 as shown in FIG. 6 so that the user of the electro-developing type camera is prompted to mount the electro-developing recording medium 30. Then, the program returns to Step 101.

When it is determined in Step 101 that the electro-developing recording medium 30 has been mounted, the message "INSERT" of the display device 70 is turned OFF (or put out) in Step 103. Then, in Step 104, it is determined whether the electro-developing recording medium 30 mounted in the camera body 11 has been recorded. This determination is based upon the degree of transparency of the light shielded portion of the electro-developing recording medium 30, the transparency corresponding to a signal outputted from the transparency sensor 93.

When the electro-developing recording medium 30 has not been recorded, Step 105 is executed in which a command signal for deleting or turning OFF the message "RECORDED" is outputted to the display device 70.

Therefore, if the message of "RECORDED" has been indicated by the display device 70, the message is deleted. Then, in Step 106, it is determined whether the record mode has been set by the main switch 10. When the record mode has not been set, the program returns to Step 101, and thus the process described above is repeated. Conversely, when the record mode has been set, Step 107 is executed, in which it is determined whether the release switch is turned ON. The release switch is turned ON when the release button 14 is fully depressed. When the release switch is not turned ON, the program returns to Step 101, but when the release switch is turned ON, a recording operation is performed at Step 108, so that a photographing operation is carried out, and thus an image is recorded in the electro-developing recording medium 30. When this recording operation is completed, the program returns to Step 101.

Referring to the left half of FIG. 4, if it is determined in Step 104 that the electro-developing recording medium 30 mounted in the camera body 11 has been recorded, Step 111 is executed in which the message "RECORDED" is indicated by the display device 70, as shown in FIG. 7. Then, in Step 112, it is determined whether a reading mode has been set by the main switch 10. When the reading mode has not been set, the program returns to Step 101. Conversely, when the reading mode has been set, Step 113 is executed during which it is determined whether or not the scanning switch 16 is turned ON. If the scanning switch 16 is not turned ON, the program returns to Step 101, yet when the scanning switch 16 is turned ON, a reading operation is performed in Step 114. That is to say, the light source 42 is turned ON and the scanning mechanism 50 is actuated, in order that the image recorded in the electro-developing recording medium 30 is read by the line sensor 44 through the scanner optical system 43.

When this reading operation is completed, Step 115 is executed, in which it is determined whether the electro-developing recording medium 30 has been removed from the camera body 11. If the electro-developing recording medium 30 has not yet been removed, the loop composed of Steps 115 and 116 is repeatedly carried out, so that the message "EJECT" is flickered by the display device 70 as shown by FIG. 5 in Step 116. The removal or ejection of the electro-developing recording medium 30 is determined based on an output signal of the recording medium sensing switch 81. When the electro-developing recording medium 30 is ejected from the camera body 11, the program moves from Step 115 to Step 117, in which the indication "EJECT" is deleted from the display device 70. Then, the program returns to Step 101.

As described above, in this embodiment, when the image recorded in the electro-developing recording medium 30 is read therefrom in Step 114, the reading operation is prohibited until Steps 115, 117, 101, 103, and 104 are executed, and it is sensed in Step 104 that another electro-developing recording medium 30 which has been recorded, is mounted in the camera body 11. Therefore, it is prohibited that an image recorded in one electro-developing recording medium 30 is repeatedly read, so that a needless reading operation is prevented.

Further, in this embodiment, when it is sensed in Step 101 that the electro-developing recording medium 30 has been mounted, the reading operation is prohibited if it is determined in Step 104, that this electro-developing recording medium 30 has not been recorded. Further, if it is sensed in Step 104 that a non-recorded electro-developing recording medium 30 is mounted, the reading operation is prohibited until it is sensed in Step 104, in the next execution of this program, that an image is recorded in the electro-developing recording medium 30. Therefore, a reading operation is prevented from being carried out in the case of an electro-developing recording medium 30 in which an image is not recorded, and thus, a wasted reading operation is prevented.

Figure 8A:
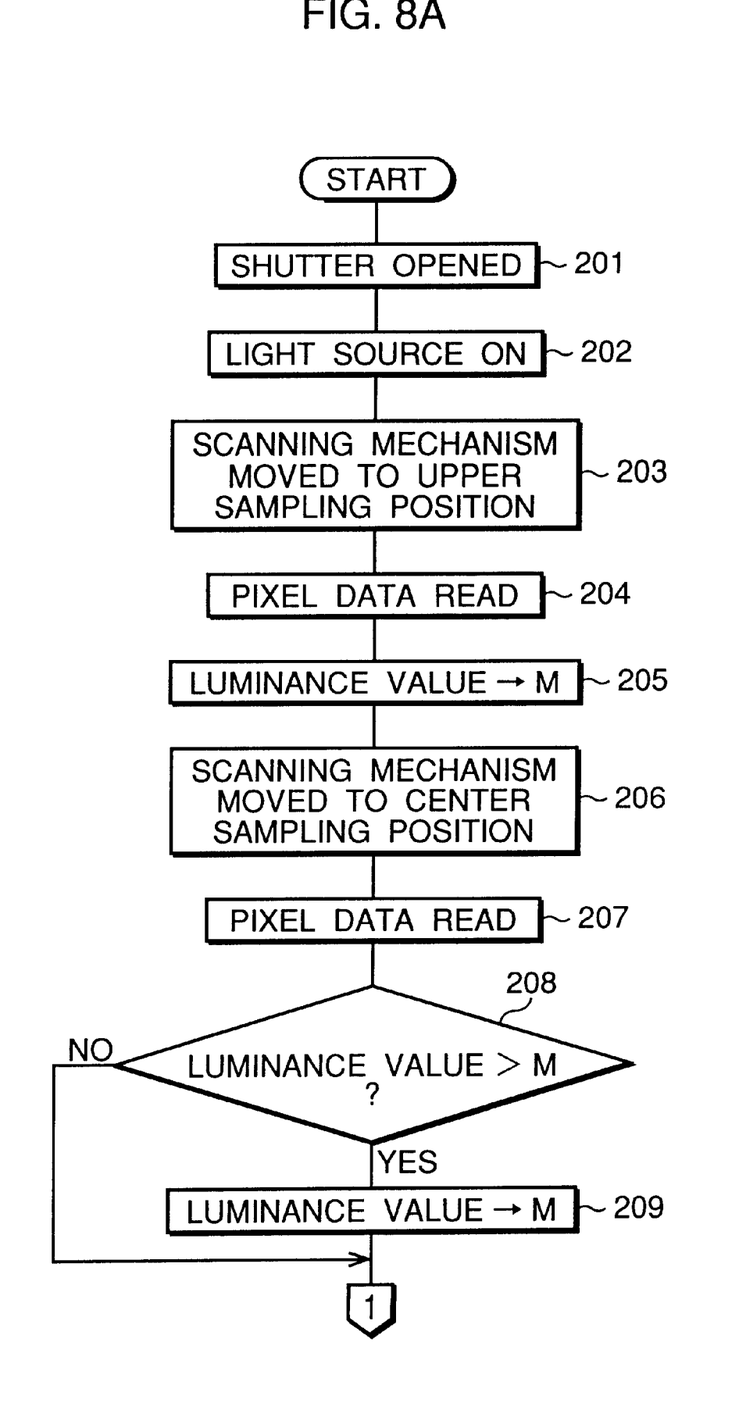
FIGS. 8A and 8B are flow charts of a program by which an image is recorded in the electro-developing recording medium and the image is read therefrom, in a second embodiment.
Figure 8B:
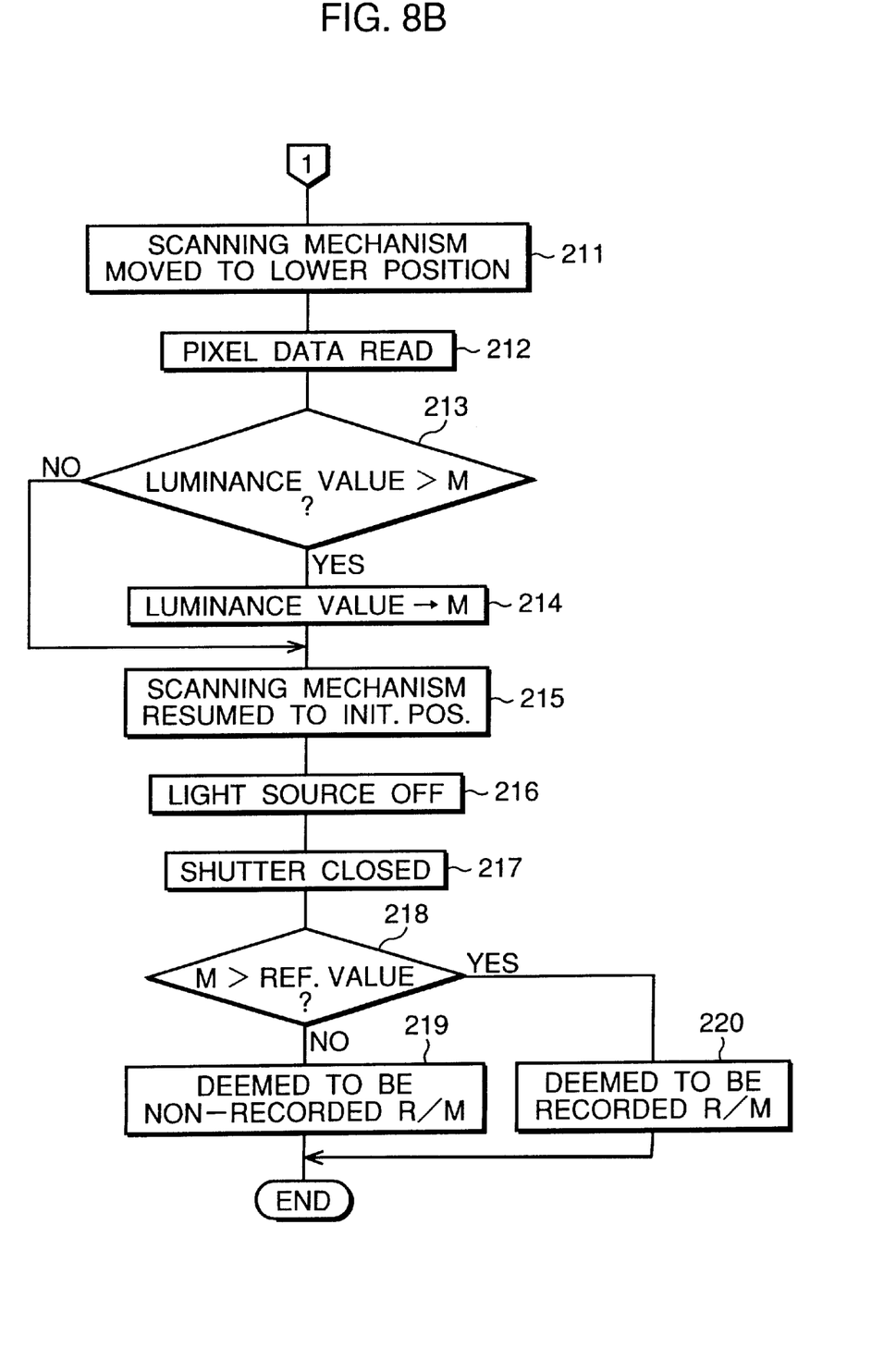

FIGS. 8A and 8B show a flow chart of a program by which it is determined whether the electro-developing recording medium 30 has been recorded in a second embodiment. In the second embodiment, the degree of transparency in a plurality of portions of the electro-developing recording medium 30 is used as a measure to determine whether the electro-developing recording medium 30 has been recorded. That is, the electro-developing recording medium 30 in this embodiment is constructed in such a manner that the transparency becomes larger in accordance with the amount of light received by the electro-developing recording medium 30, and the light shield portion such as the aluminum foil fragment 91 shown in FIG. 3 is not provided.

In Step 201, the shutter 22 is opened, and in Step 202, the light source 42 is turned ON by the light source drive circuit 45. In Step 203, the scanning mechanism 50 is moved to a first sampling position of the electro-developing recording medium 30, and is stopped there. The first sampling position is, for example, a position close to the upper end of the image recorded in electro-developing recording medium 30. In Step 204, pixel data corresponding to the first sampling position, i.e. data of one horizontal scanning line is read through the line sensor 44, so that the maximum value of the luminance value of the one horizontal scanning line is obtained based on the pixel data. The luminance value corresponds to the transparency of the electro-developing recording medium 30 at the horizontal scanning line, and is stored in a memory provided in the system control circuit 20 as the maximum value M in Step 205.

Then, in Step 206, the scanning mechanism 50 is moved to a second sampling position of the electro-developing recording medium 30, and is stopped there. The second sampling position corresponds to the center of the image. In Step 207, similarly to Step 204, pixel data are read through the line sensor 44, and so that the maximum value of the luminance value of the one horizontal scanning line is obtained based on the pixel data. In Step 208, it is determined whether the luminance value obtained in Step 207 is larger than the maximum value M. When the luminance value is larger than the maximum value M, the luminance value is rewritten as the maximum value M in Step 209, and when the luminance value is not larger than the maximum value M, Step 209 is skipped.

In Step 211, the scanning mechanism 50 is moved to a third sampling position of the electro-developing recording medium 30, and is stopped there. The third sampling position corresponds, for example, to the lower end of the image recorded in electro-developing recording medium 30. In Step 212, in a similar way to Steps 204 and 207, pixel data is read through the line sensor 44, and so the maximum value of the luminance value of the one horizontal scanning line is obtained. In Step 213, it is determined whether the luminance value obtained in Step 212 is larger than the maximum value M. When the luminance value is larger than the maximum value M, the luminance value is rewritten as the maximum value M in Step 214, and when the luminance value is not larger than the maximum value M, Step 214 is skipped.

Thus, the maximum value of the luminance values (i.e. transparency) of the three portions of the electro-developing recording medium 30 is obtained.

In Step 215, the scanning mechanism 50 is resumed to the initial position, i.e. the position where the scanning mechanism was located before the execution of Step 201. In Step 216, the light source 42 is turned OFF through the light source drive circuit 45, and in Step 217, the shutter 22 is closed.

In Step 218, it is determined whether the maximum value of the transparencies of the three portions is higher than a reference value, which is, for example, a maximum value of the transparency in each of the portions included in the electro-developing recording medium 30 which had not been recorded. Namely, when the maximum value M is less than or equal to the reference value, in Step 219, the electro-developing recording medium 30 is deemed to be non-recorded, and a message meaning that the electro-developing recording medium 30 has not been recorded is indicated by the display device 70. When the maximum value M is larger than the reference value, in Step 220, the electro-developing recording medium 30 is deemed to be recorded, and a message meaning that the electro-developing recording medium 30 has been recorded is indicated by the display device 70. Then, the program ends.

According to the second embodiment, the same effect as in the first embodiment is obtained.

Note that the electro-developing recording medium 30 is not restricted to the construction shown in FIG. 3, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI 7-331053, (filed on Nov. 27, 1995) which is expressly incorporated herein, by reference, in its entirety.

We claim:

1. A device for controlling a reading operation of an image reading device, in which an image recorded to a recording medium is read therefrom, said reading operation control device comprising:

a first sensor that outputs a first signal indicative of a mounting operation and a removal operation of a recording medium associated with said image reading device;

a first determining processor that determines whether a recording medium has been mounted in said image reading device, based upon said first signal output by said first sensor;

a second sensor that outputs a second signal indicating whether an image has been recorded to the mounted recording medium;

an image reading processor that reads said image recorded to the mounted recording medium; and a reading operation prohibiting processor that prohibits a subsequent reading operation of said image reading processor until said first determining processor determines that another recording medium is mounted in said image reading device and said second sensor outputs a signal indicating that an image is recorded to the another recording medium.

2. The reading operation control device of claim 1, further comprising a second determining processor, that receives said second signal output by said second sensor, to determine whether the another recording medium has an image recorded thereon, said second determining processor being actuated when the another recording medium is mounted in said image reading device, said reading operation prohibiting processor prohibiting a reading operation of said image reading processor when the another recording medium does not have an image recorded thereon.

3. A reading operation control device according to claim 1, wherein said reading operation prohibiting processor prohibits a reading operation of said image reading processor until an image is recorded to said non-recorded recording medium when a non-recorded recording medium is mounted in said image reading device.

4. A reading operation control device according to claim 1, further comprising an indicating processor that indicates whether said recording medium mounted in said image reading device has been recorded.

5. A reading operation control device according to claim 1, wherein said recording medium comprises an electro-developing recording medium by which an image is electronically developed.

6. A reading operation control device according to claim 5, wherein said electro-developing recording medium comprises an electrostatic information recording medium that generates an electric charge in accordance with an image formed thereon, and an electric charge storage medium which generates a visible image in accordance with said electric charge and which can hold said visible image.

7. A reading operation control device according to claim 6, wherein said electric charge storage medium comprises a liquid crystal display having a memory-type liquid crystal.

8. A device for controlling an operation of an electro-developing type camera, in which an image obtained by an optical photographing system is formed on an electro-developing recording medium, by which said image is electronically developed and held therein, said control device comprising:

a first sensor that outputs a first signal indicative of a mounting operation and a removal operation of an electro-developing recording medium associated with said electro-developing type camera;

a determining processor that determines whether the electro-developing recording medium has been mounted in said electro-developing type camera, based upon said first signal output by said first sensor;

a second sensor that outputs a second signal indicating whether an image has been recorded to the mounted electro-developing recording medium;

an image reading processor that reads said image held in said mounted electro-developing recording medium; and a reading operation prohibiting processor that prohibits a subsequent reading operation by said image reading processor, when said reading operation has been completed, until said determining processor determines that the electro-developing recording medium has been removed and another electro-developing recording medium is mounted, and said second signal of said second sensor indicates that the another mounted electro-developing recording medium includes a recorded image.

9. A device for controlling a reading operation of an image reading device, in which an image recorded to a recording medium is read therefrom, said reading operation control device comprising:

first means for sensing a mounting operation and a removal operation of a recording medium associated with said image reading device;

means for determining whether a recording medium has been mounted in said image reading device, based upon a signal produced by said first sensing means;

a second sensor that outputs a second signal indicating whether an image has been recorded to the mounted recording medium;

means for reading said image recorded to said recording medium; and means for prohibiting a subsequent reading operation of said image reading processor after said reading operation of said image reading means has been completed, until said determining means determines that another recording medium has been mounted in said image reading device and said second sensing means produces a signal indicating that the another mounted recording medium contains an image recorded thereon.

10. The reading operation control device of claim 1, wherein the recording medium and the another recording medium comprise a same recording medium.

11. The controlling device of claim 8, wherein the electro-developing recording medium and the another electro-developing recording medium comprise a same electro-developing recording medium.

12. The controlling device of claim 9, wherein the recording medium and the another recording medium comprise a same recording medium.

* * * * *